United States Patent [19]
Wood et al.

[11] Patent Number: 5,121,550
[45] Date of Patent: Jun. 16, 1992

[54] AUTOMATIC SURFACE TRACER

[75] Inventors: Kenneth O. Wood, Stafford Springs; Jeffrey Murray, Ellington; Robert J. Pavone, South Windsor, all of Conn.

[73] Assignee: Gerber Optial, Inc., South Windsor, Conn.

[21] Appl. No.: 621,515

[22] Filed: Dec. 3, 1990

[51] Int. Cl.⁵ .......................... G01B 7/28; B24B 9/14
[52] U.S. Cl. .................................. 33/551; 33/28; 33/200; 33/507; 33/554; 51/105 LG
[58] Field of Search ............... 33/551, 200, 28, 507, 33/504, 549, 546, 553, 554, 556; 51/101 LG, 105 LG

[56] References Cited

U.S. PATENT DOCUMENTS

| | | | |
|---|---|---|---|
| 3,192,628 | 7/1965 | Wroble et al. | 33/554 |
| 3,555,739 | 1/1971 | Novak | 51/101 LG |
| 3,786,600 | 1/1974 | Bloxsom | 51/101 LG |
| 3,895,446 | 7/1975 | Orlov et al. | 33/560 |
| 4,051,601 | 10/1977 | Godot | 33/200 |
| 4,517,870 | 5/1985 | Kopp | 51/101 LG |
| 4,724,617 | 2/1988 | Logan et al. | 33/28 |
| 4,991,305 | 2/1991 | Saigo et al. | 33/200 |
| 4,995,170 | 2/1991 | Brulé et al. | 33/551 |

Primary Examiner—Allan N. Shoop
Assistant Examiner—C. W. Fulton
Attorney, Agent, or Firm—McCormick, Paulding & Huber

[57] ABSTRACT

A device for tracing a surface such as one defining the lens opening of an eyeglass frame includes a tracer element moved automatically about a rotational axis surrounded by the traced surface and arranged perpendicularly to the area enclosed by the surface. As this rotation occurs a carrier for the tracer element is moved along a second axis extending perpendicularly to the rotational axis in response to a position error signal developed by the tracer element to maintain the position error signal at a substantially zero value through the use of feedback circuitry. The positions of the carrier about the rotational axis and along the second axis are repeatedly captured during the tracing movement to provide point data defining the shape of the traced surface. Results are a smooth steady movement of the tracer element along the surface with a minimum amount of force being exerted on the traced surface by the tracer element.

14 Claims, 7 Drawing Sheets

AUTOMATIC SURFACE TRACER

BACKGROUND OF THE INVENTION

This invention relates to a device for tracing surfaces, particularly closed surfaces each of which may be used as a reference for the edging of an eyeglass lens to cause it to fit into a given lens opening in an eyeglass frame, to provide output data describing the shape of the traced surface; and deals more particularly with improvements in such a device permitting the tracing operation to proceed substantially automatically, quickly and accurately with very little pressure having to be applied to the traced member.

The device of this invention has been developed and is particularly well adapted to the tracing of a surface defining a shape to be applied to an eyeglass lens during its edging to cause it to fit properly into the lens opening of a given eyeglass frame. Accordingly, the invention is described and illustrated herein in association with such an application. It is to be understood, however, that in at least its broader aspects the invention may be applied to other applications where it is desirable to obtain data describing the shape of surfaces, especially closed or substantially closed ones. Therefore, it is intended that the scope of the invention not be limited only to tracing devices applied to the field of eyeglass manufacture.

In the eyeglass field, an apparatus for performing substantially the same function as the apparatus of this invention is already known from U.S. Pat. No. 4,724,617. That is, the apparatus of said patent is one for providing data describing the shape of a lens opening of a given eyeglass frame by moving a stylus along the closed surface of the frame defining the opening, detecting the position of the stylus at many points during its traverse along the closed surface with reference to a given coordinate system, and then processing the detected points to provide a set of output data describing the shape of the traced surface and usable subsequently by an edging machine to edge an eyeglass lens to a shape matching that of the lens opening. The stylus, however, is guided manually along the surface to be traced. This makes the tracing operation relatively slow and subject to human errors. It is difficult for an operator to apply a small steady force to the stylus during the tracing process with the result that often, especially in the case of a light flimsy frame, the frame may be bent seriously out of shape during the tracing procedure causing the apparatus to output inaccurate shape data. The problem of frame bending during tracing can be attacked by holding the frame at a large number of points along the circumference of the lens opening to better counteract the bending forces applied by the stylus, but this substantially increases the cost and complexity of the holder and greatly increases the time required to move a frame into and out of the holder.

The general object of this invention is therefore to provide a surface tracing apparatus avoiding the problems mentioned above. Particularly, the object is to provide an apparatus wherein the tracer stylus or other tracer element is moved automatically along the surface to be traced, without human guidance, in a rapid and precise way to allow the tracing operation to be performed in a short time, and whereby the tracer element exerts only a very low force on the traced surface to inhibit distortion of the surface shape.

A further object of the invention is to provide an apparatus of the foregoing character particularly adapted to the tracing of a closed surface defining the lens opening of an eyeglass frame whereby such low forces are exerted on the frame by the tracer element that even relatively flimsy frames can be accurately traced using a relatively simple and quickly operated holder for the frame. That is, a simple holder holding a frame only in the vicinity of the nose piece area can be used for practically all frames without additional holding points having to be provided for weak frames.

Another object of the invention is to provide a tracing apparatus of the foregoing character which may be used either for the tracing of the lens opening of an eyeglass frame, where the traced surface faces inwardly toward the rotational axis of the tracer element, or to trace a lens pattern, a dummy lens or an actual lens where the closed surface being traced faces outwardly away from the rotational axis of the tracer element.

Other objects and advantages of the invention will be apparent from the following description of the preferred embodiments of the invention.

SUMMARY OF THE INVENTION

The invention resides in an automatic surface tracing device including a holder for releasably holding a member providing a closed surface to be traced and also including a first structure. The holder and first structure are moveable relative to one another about a rotational, or $\theta$, axis passing through and oriented generally perpendicularly to the area enclosed by the closed surface. A carrier is supported on the first structure for movement relative to it along a second, or R, axis extending generally perpendicularly to the rotational axis. A sensor with a tracer element is carried by the carrier and operates when the carrier is within a sensing zone located in the proximity of the traced surface to provide a signal varying substantially linearly with the displacement of a reference point on the carrier from the traced surface. This signal is in turn used to provide the position error signal for a feedback system used to control the movement of the carrier along the second axis so as to maintain the position error signal at a substantially null value, accordingly causing the carrier to be automatically maintained at a position along the second axis corresponding to the spacing of the closed surface from the rotational axis at the point encountered by the tracer element. As the holder and first structure are rotated relative to one another to move the tracer element along the closed surface the carrier is thus automatically positioned along the second axis in accordance with the displacement of the curved surface from the rotational axis at the momentary sensing point; and data defining the shape of the closed surface is obtained by repeatedly simultaneously sensing the position of the holder and first structure relative to one another about the rotational axis and the position of the carrier along the second axis.

The invention also resides in further details set forth in the accompanying claims.

DETAILED DESCRIPTION OF THE PREFERRED EMBODIMENTS

In FIGS. 1-10 the invention is shown embodied in an apparatus indicated generally at 14 for tracing a closed surface on a given member and having a shape to be subsequently reproduced during the edging of an eyeglass lens to cause the lens to fit properly into the lens opening of an eyeglass frame. Most usually the involved member is an eyeglass frame itself with the traced surface being a closed surface of the frame defining one of its lens openings. However, the traced member may not always be an eyeglass frame. For example, in the case of a partial frame where the frame extends only partly around the circumference of each lens, or in the case of a frame of the type wherein each lens along a part of its circumference is engaged by a flexible nylon string or the like, the frame manufacturer may provide a lens pattern or a dummy lens having a closed outwardly facing surface defining the shape of the lens to be edged for the frame. Also, in a case where one lens of an eyeglass is broken a lens manufacturer in making a replacement for the broken lens may remove the other unbroken lens from the frame and use it as a reference for determining the shape of the replacement lens.

The apparatus 14 is therefore one designed for use either for the tracing of an inwardly facing closed surface or the tracing of an outwardly facing closed surface. To illustrate this versatility of the apparatus, FIG. 1 shows it in the process of being used in conjunction with an eyeglass frame 16 wherein the closed surface 18 is an inwardly directed one defining one lens opening 19 of the frame, and FIG. 2 illustrates the same apparatus in the process of being used in a situation where the closed surface to be traced is an outwardly facing one provided by a member 24 which may be either a lens pattern, a dummy lens, or an actual lens.

Figure 1:
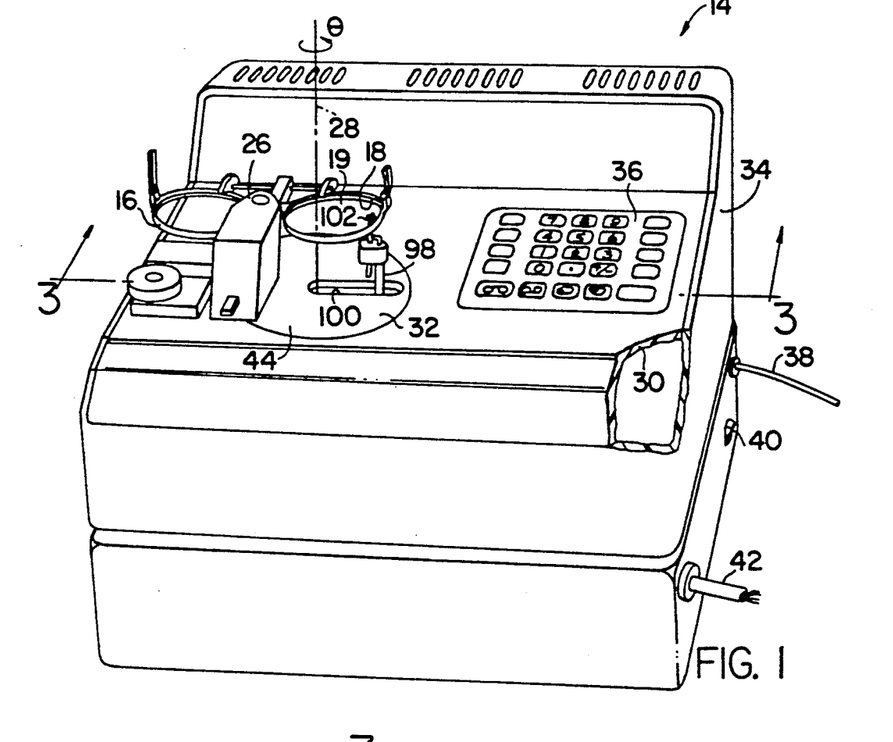
FIG. 1 is a perspective view of a tracing apparatus embodying this invention and shown in use in the tracing of an eyeglass frame lens opening, with part of the apparatus being shown broken away.
Figure 2:
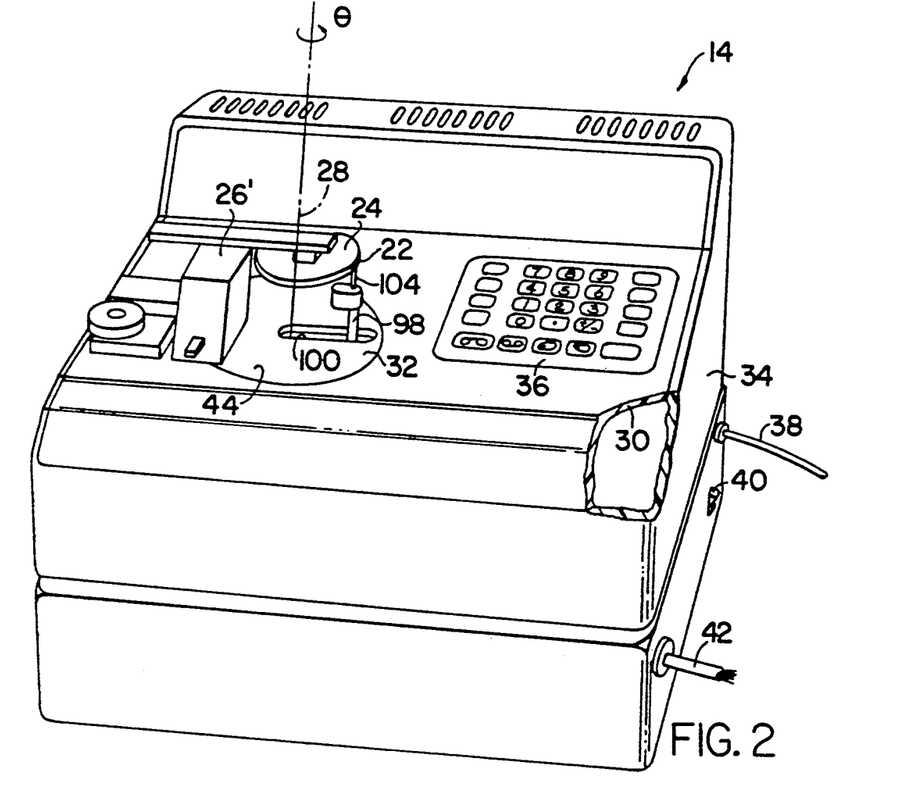
FIG. 2 is a view similar to FIG. 1 except for the apparatus being shown in the process of tracing a lens pattern, dummy lens or actual lens.

In FIG. 1 the apparatus 14 includes a holder 26 of relatively simple construction for releasably holding an eyeglass frame, such as the illustrated frame 16, to the apparatus 14 during a tracing operation. The structure of this holder may vary widely without departing from the invention but due to the light forces imposed on the frame during the tracing process it is generally sufficient that the holder engage the frame at only a few points in the vicinity of the nose piece area of the frame. In FIG. 2 the apparatus 14 includes a modified holder 26' especially adapted to hold a part such as the illustrated one 24 instead of an eyeglass frame. Preferably, the two holders 26 and 26' are so designed that a number of parts serve in common for both the holder 26 and the holder 26' and so that a conversion can be readily made between the holder 26 and the holder 26' by a simple exchange of other parts and/or adjustment of the common parts.

The apparatus 14 also includes a first structure and a means for moving the holder and the first structure relative to one another about a rotational, or $\theta$, axis 28 surrounded by the closed surface 18 or 22 to be traced and oriented substantially perpendicularly to the area enclosed by such surface. This relative rotation may be achieved in a number of different ways. In the illustrated case the apparatus 14 includes a base structure in the form of a base plate 30 to which the holder 26 or 26' is fixed, and the first structure is one, indicated at 32, which rotates relative to the base plate 30 and holder 26 or 26' about the rotational axis 28. The base plate 30 is supported in the position shown in FIGS. 1 and 2 by a housing 34 having an upwardly facing top opening for receiving the base plate. On the top surface of the base plate is a keypad 36 having a number of keys for use by an operator in controlling the apparatus. Electrical power to the apparatus is supplied by a line 38 and controlled by an on/off switch 40 carried by the housing. A cable 42 transmits output data produced by the apparatus to another device such as a lens edger or a recorder for recording the data for later use.

Figure 3:
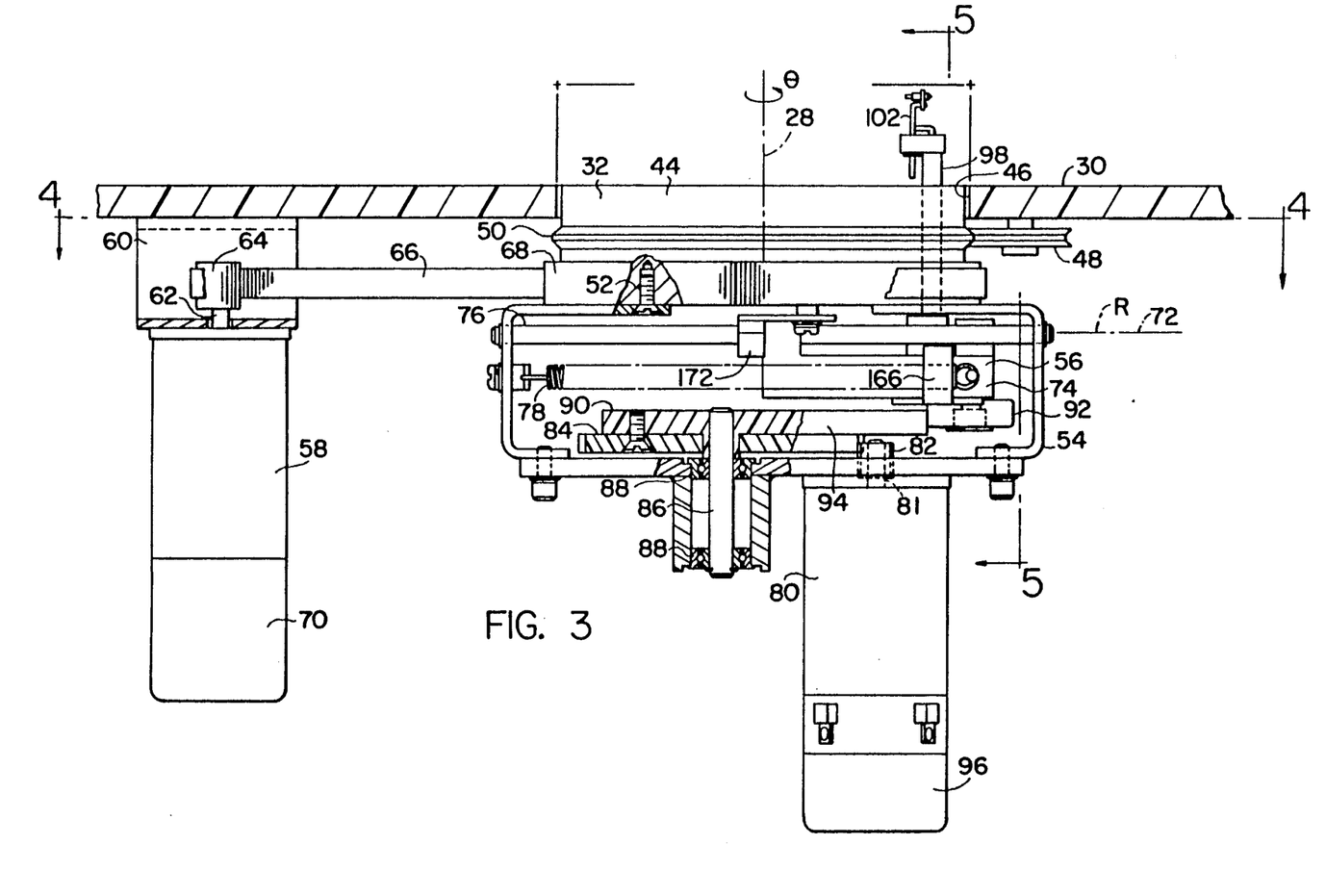
FIG. 3 is a substantially vertical fragmentary view taken on the line 3—3 of FIG. 1 with the holder being shown removed from the base plate.
Figure 4:
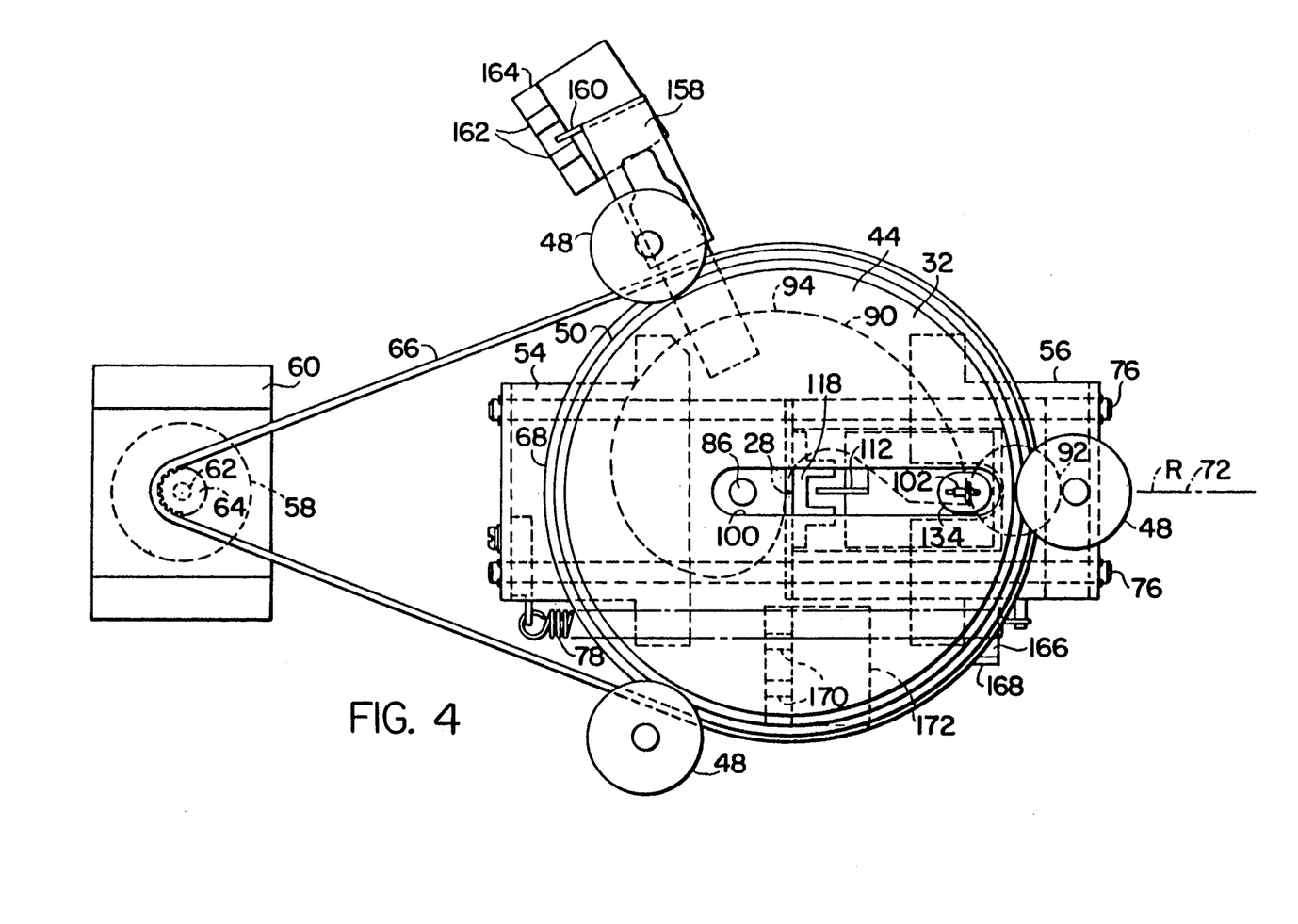
FIG. 4 is substantially horizontal view taken on the line 4—4 of FIG. 3 with the base plate being shown removed

Turning to FIGS. 3 and 4, the first or rotating structure 32 includes a body 44 having an upper cylindrical portion received in a circular opening 46 in the base plate 30 with the body extending downwardly below the lower surface of the base plate and being supported for rotation about the axis 28 relative to the base plate by three bearings 48 supportingly engaging a circular rib 50 on the body 44. Fixed to the bottom of the body 44, as by screws one of which is shown at 52, is a bracket 54 supporting a sliding carrier 56 and an associated drive mechanism for the carrier.

The structure 32 is moveable about the rotational axis 28 by a drive mechanism including a servomotor 58, fixed to the base plate 30 by a bracket 60, having a rotatable output shaft 62 having fixed to it a toothed pinion 64. A toothed belt 66 passes over the pinion 64 and over a toothed portion 68 of the body 44 to rotate the structure 32 in response to operation of the motor 58. Associated with the motor 58 is an encoder 70 producing an output signal related to the momentary angular position of the output shaft 62.

The carrier 56 is supported by the bracket 54 for movement along a second, or R, axis 72 extending perpendicularly to the rotational axis 28. In particular, the carrier includes a main body 74 supported for sliding movement along the axis 72 by two parallel guide rods 76 carried by the bracket 54. A tension spring 78 connected between the carrier body 74 and the bracket 54 biases the carrier 56 toward the left as seen in FIG. 3.

The driving mechanism for the carrier 56 includes a servomotor 80 fixed to the bracket 54 and having an output shaft 81 carrying a pinion 82 meshing with a gear 84 supported by a shaft 86 in turn supported by bearings 88 for rotation relative to the bracket 54. Fixed to the gear 84 for rotation therewith is a cam 90 engaged by a follower roll 92 carried by the carrier body 74. The surface of the cam which engages the follower 92 is indicated at 94. In FIG. 4 the cam 90 is shown positioned so as to hold the follower 92 and carrier 56 at their furthermost positions from the rotational axis 28. From this position the cam 90 is rotatable clockwise, as seen in FIG. 4, approximately a full 360° to another position at which the follower 92 and carrier 56 are positioned at their closest approaches to the rotational axis 28, the spring 78 maintaining the follower 92 in engagement with the cam surface 94 during the rotation of the cam. To simplify the calculations required by the computer (shown at 176 in FIG. 9) associated with the apparatus 14, the cam surface 94 is preferably designed so as to have a constant rise with respect to the rotation of the output shaft 81 of the drive motor 80. That is, the cam surface is preferably such that throughout the rotational range of the cam a given unitary angular displacement of the motor drive shaft results in a related unitary displacement of the carrier 56 along the second axis 72. Associated with the drive motor 80 is an encoder 96 providing output signals defining the momentary angular position of the output shaft of the motor 80.

A purpose of the carrier 56 is to support a sensor with a tracer element which is moveable by the carrier into the vicinity of the surface to be traced and which when within such vicinity produces an output signal related to the displacement of a reference point on the carrier from the surface being traced, as measured parallel to the axis 72, which signal is then used to provide a position error signal to control the movement of the carrier along the axis 72 by the motor 80. This sensor may vary without departing from the broader aspects of the invention. However, in the presently preferred case, and as shown by Figs. 1-10, the sensor includes as its tracer element a stylus 98 carried by the carrier 56 and extending generally upwardly therefrom through a radial slot 100 in the body 44 and oriented perpendicularly to the rotational axis 28. At its upper end the stylus 98 carries an engagement part for engaging the surface to be traced and which engagement part may be varied, as by interchange among a selection of such parts, to suit the nature of the traced surface. For example, in FIGS. 1, 3, 5, 7, 8, and 9 the engagement part is indicated at 102 and is one designed for use in the tracing of an inwardly facing grooved lens opening surface such as the surface 18, whereas in FIGS. 2, and 10 the engagement part is indicated at 104 and is one designed for use with an outwardly facing ungrooved surface such as the surface 22.

Figure 7:
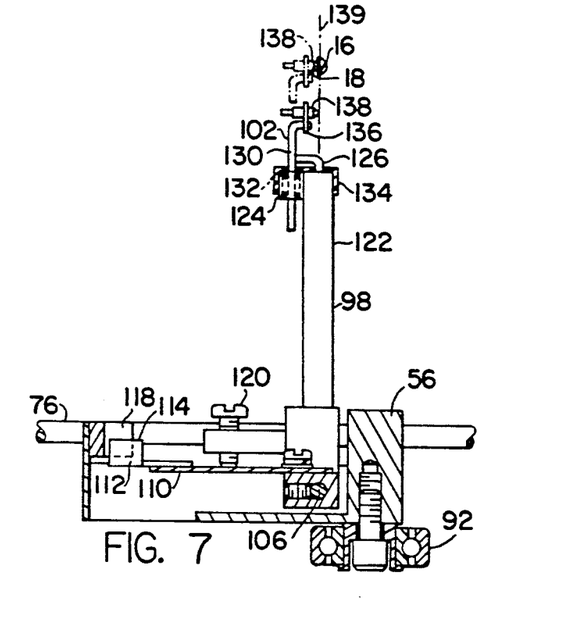
FIG. 7 is a vertical sectional view of the carrier taken on the line 7—7 of FIG. 5.

The stylus 98 is supported for rotation relative to the carrier body 74 by being fixed to a pivot shaft 106 supported by the body 74 for rotation relative to the body about a pivot axis 108. Also fixed to the shaft 106 for movement about the pivot axis 108 in unison with the stylus 98 is a plate 110 carrying an opaque flag 112 having a sensing edge 114 as seen in FIG. 7. The flag moves between the two legs 116 of an optical sensor 118 containing an optical transmitter in one leg and an optical receiver in the other leg with the receiver producing an output voltage signal having a value related to the amount of light received from the transmitter. Accordingly, as the flag moves between the legs 116, in response to movement of the stylus 98 about the pivot axis 108, a substantially linear signal is produced from the photo sensor 118. By proper biasing of the photo sensor this signal is converted to an output one having a zero voltage value when the stylus is in its neutral position and a plus or minus voltage value when the stylus is positioned to one side or the other of its neutral position Preferably, the stylus 98 when in such neutral position extends perpendicularly from the body 56 and parallel to the rotational axis 28 as shown in FIG. 7. The positional relationship between the optical sensor 118, the flag 112 and the stylus 98 required to achieve this neutral orientation of the stylus is adjustable by means of the adjusting screw 120 seen in FIG. 7.

The holder 26 of FIG. 1 holds a frame 16 spaced at some distance above the top of the circular body 44. The engagement part 102 of the stylus is slidable relative to the lower portion of the stylus to allow it to be brought into proper vertical relationship with the frame. As shown best in FIGS. 5, 7 and 8, the lower part of the stylus is formed by a main tube 122 and a short section of another tube 124 attached to the upper end of the tube 122. The engagement part 102 has a first leg 126 vertically slidable in the tube 122 and is preferably supported by two jeweled bearings 128 in the tube 122. The axis of the rod 126 as supported by the tube 122 passes through the pivot axis 108 of the pivot shaft 106. The engagement part also includes a second rod 130 slidably passing through the short tube 124 and also preferably supported by a jeweled bearing 132 carried by the tube 124. At its upper end the main rod 126 is bent laterally and welded to the second rod 130 as seen best in FIG. 7. A cup-shaped finger grip 134 of plastic or the like loosely fits over the upper ends of the tubes 122 and 124 below the bent over portion of the main rod 126 and can be grasped by a user to raise and lower the engagement part 102 relative to the remainder of the stylus. At its upper end the second rod 130 is also bent laterally, as shown in FIG. 7, and carries a small mounting plate 136 carrying a jewel 138 constituting the part which actually contacts the frame surface 18 to be traced. This frame surface usually includes an inwardly extending groove for receiving the edge of a lens and the tip of the jewel 138 is preferably given a shape suitably conforming to the shape of the groove. In FIG. 7 the solid lines show the engagement part 102 in its lowered position relative to the remainder of the stylus and the broken line show it in a raised position at which it engages a frame 16 for tracing purposes. The use of the two rods 126 and 130 prevents the engagement part from rotating about the axis of the stylus and the tendency for such rotation is further inhibited by the tip of the jewel 138 being located on or very close to the axis 139 of the stylus as shown in FIG. 7. The engagement part can also be pulled in its entirety from the tubes 122 and 124, if desired, to permit its replacement by another slightly different part which may better suit the job at hand.

Figure 5:
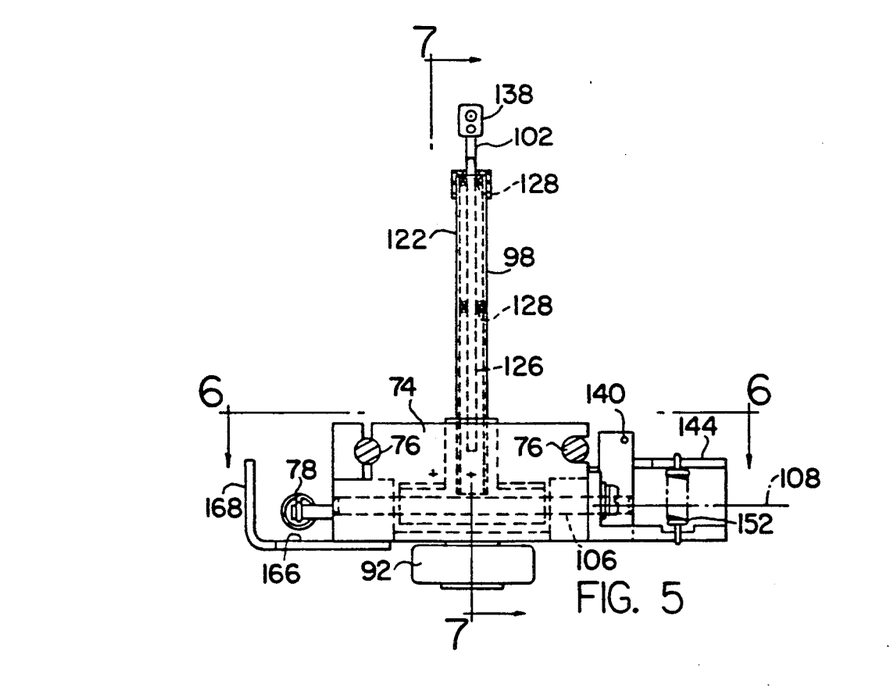
FIG. 5 is a front elevational view of the carrier taken on the line 5—5 of FIG. 3.
Figure 6:
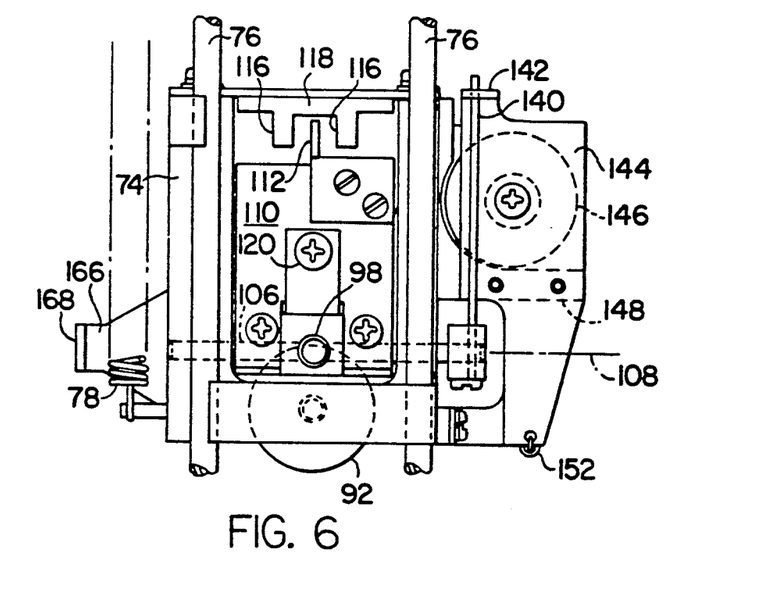
FIG. 6 is a plan view of the carrier taken on the line 6—6 of FIG. 5.
Figure 8:
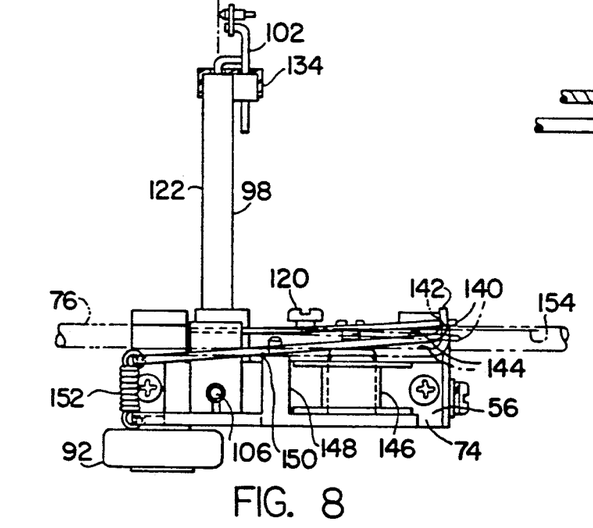
FIG. 8 is a side view of the carrier taken looking toward the left in FIG. 5.

The carrier 56 also includes a means for biasing the stylus 98 about its pivot axis 108 in such a direction as to urge the engagement part toward engagement with the surface being traced. From FIGS. 1 and 2 it will be evident that the direction of bias to be provided by such biasing means depends on whether the surface being traced is an inwardly facing one or an outwardly facing one. Referring to FIGS. 5, 6 and 8, the illustrated biasing means includes a light spring 140 made of a length of spring wire having one end fixed to the stylus pivot shaft 106 and its other end received in and passing through a hole in an upstanding tab 142 formed on the armature 144 of an electrical solenoid 146 carried by the carrier body 74. As seen in FIG. 8, the armature 144 rests on a fulcrum 148 for movement about a pivot axis 150 between two positions shown by the full and broken lines of FIG. 8. The solid line position corresponds to de-energization of the solenoid 146 with the armature being held in that position by a spring 152 When the solenoid 146 is energized the armature moves to the broken line position against the force of the spring 152. The line 154 of FIG. 8 represents the position taken by the spring 140 if it were undeflected by the armature 144 and if the stylus 98 were in its neutral position. Therefore, it will be obvious from FIG. 8 that for a range of stylus movement including its neutral position when the solenoid armature is positioned as shown by the full lines of FIG. 8 the stylus is biased by the spring 140 in the counterclockwise direction (for use with an inwardly facing surface to be traced), whereas when the armature is in the broken line position of FIG. 8 the stylus is biased by the spring 140 in the clockwise direction (for use with an outwardly facing surface).

Figure 10:
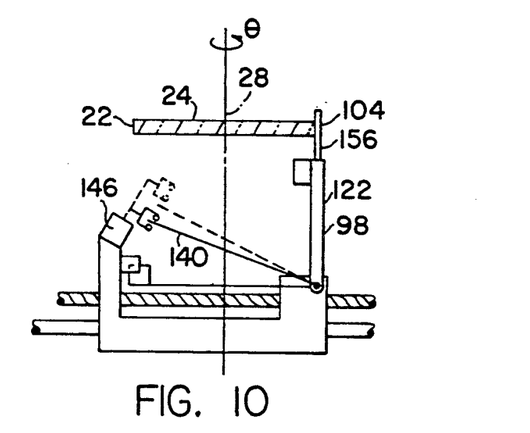
FIG. 10 is a view repeating a portion of FIG. 9 but with the stylus being shown biased for the tracing of an outwardly facing closed surface.

Referring to FIGS. 2 and 10, the engagement part 104 of the stylus used in association with the tracing of an ungrooved and outwardly facing closed surface may, as illustrated, merely be a straight rod 156 inserted in the bore of the main tube 122 of the lower stylus portion.

In addition to the sensor for producing the position error signal described above, the apparatus 14 also includes two other similar sensors for initializing purposes. One of these is for establishing an initial or zero reference position of the rotating structure 32 relative to the base plate 30 about the rotational axis 28. As shown in FIG. 4 this sensor comprises a flag element 158 fixed to the circular body 44 and carrying an opaque flag 160 passing between the two legs 162, 162 of an optical sensor 164. similar to the optical sensor 118, fixed to the base plate 30. Therefore, when the flag 160 passes through the optical sensor 164, an output signal is produced the value of which varies directly with the angular position of the flag and one value of which is selected to represent the zero position of the body 44 relative to the base plate 30.

The second initializing sensor is used to indicate a zero position of the carrier relative to the rotating body 44 in its movement along the second axis 72. In the illustrated case, as seen best in FIG. 4, this sensor comprises a flag element 166 fixed to the carrier 56 and having a flag tab 168 arranged to pass through the legs 170 of a photo sensor 172, similar to the detector 118, fixed to the body 44. Therefore, as the tab 168 passes between the legs 170 a signal is produced which varies directly with the position of the carrier 56 along the axis 72 and one value of this signal is chosen to represent the zero position of the carrier.

Figure 9:
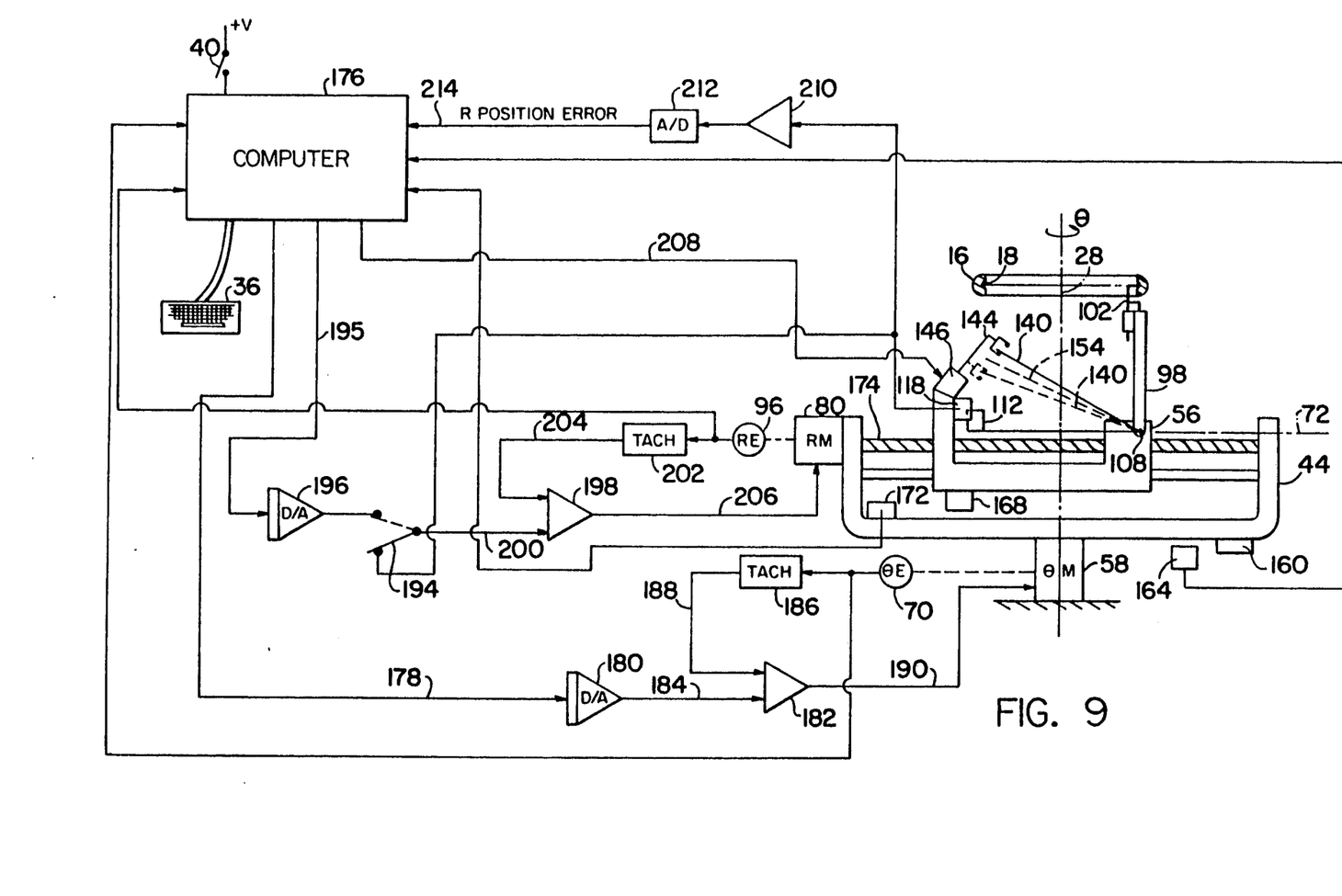
FIG. 9 is a schematic view showing the control system for the apparatus of FIG. 1 with the stylus being shown biased for the tracing of an inwardly facing closed surface.

A control circuit is included in the apparatus 14 for controlling the other parts of it in such a way as to achieve automatic tracing of the involved closed surface after the surface providing member is properly placed in the apparatus and the stylus brought into initial engagement with the surface. Reference is now made to FIG. 9 for a description of that circuit with FIG. 9 showing the tracing of the inwardly facing surface 18 provided by the eyeglass frame 16 of FIG. 1. For purposes of clarity, in FIG. 9 the mechanical components of the apparatus are shown in schematic form with the circular body 44 being driven directly by the motor 58 in rotation about the rotational axis 28 and with the carrier 56 being driven along the second axis 72 by the motor 80 through a lead screw 174.

As shown in FIG. 9, the control circuit includes a computer 176. Each time the power switch 40 is turned from off to on the computer undergoes an initializing procedure. In this procedure, the computer 176 first operates the motor 58 to drive the body 44 around the rotational axis 28 until the zero position is sensed by the sensor 164. When this zero position is attained the encoder 70 is interrogated and its output signal thereafter used by the computer to represent the zero position of the body 44 about the axis 28. The operation of the motor 58 required to achieve this initializing movement of the body 44 is obtained by the computer providing a digital velocity signal on the line 178 to a digital-to-analog converter 180. The converter 180 transforms this digital signal to an analog voltage velocity command supplied to an operational amplifier 182 over the line 184. The output of the encoder 70 is transmitted to a tachometer circuit 186 providing on the line 188 a voltage signal representing the actual rotational speed of the body 44. The amplifier 182 then compares the signals on the lines 184 and 188 and produces an output signal on the line 190 causing the motor 58 to be operated at the speed commanded by the signal on the line 184. The velocity signal from the computer is stopped when the computer senses the zero position signal from the sensor 164.

Following the above-described initialization of the rotary position of the body 44 about the rotational axis 28, the computer executes a program of initializing the position of the carrier 56 by operating the motor 80 to bring the flag 168 to the sensor 172 until the sensor 172 produces a zero position signal. The output of the encoder 96 is then interrogated by the computer and such output thereafter used by the computer to represent the zero position of the carrier along the second axis 72. During this initialization the computer sets an internal switch, represented diagrammatically at 194 in FIG. 9, to the broken line position of FIG. 9 and supplies a digital command over the line 195 to a digital-to-analog converter 196, with the analog voltage output of the converter in turn being transmitted to an operational amplifier 198 over the line 200. The output of the encoder 96 is supplied to a tachometer circuit 202 which supplies an analog voltage signal representing the actual speed of the carrier 56 over the line 204 to the amplifier 198. The amplifier 198 compares this signal with the signal on the line 200 and produces an output signal on the line 206 causing the motor 80 to be operated at the speed selected by the computer. When the computer detects the zero position signal from the sensor 172 the speed signal to the line 195 is stopped.

Following the initializations described above, the computer 176 transfers the switch 194 to the position shown by the solid lines of FIG. 9. This causes the output of the position error sensor 118 of the carrier 56 to be supplied to the amplifier 198 over the line 200. By now applying finger pressure to the stylus 98 the stylus and carrier 56 are moved to bring the engagement part 102 of the stylus into engagement with the closed surface 18 of the frame 16.

A start button is then pushed on the keypad 36 as a result of which the computer 176 begins execution of a tracing program. Different start buttons are provided on the keypad 36 for starting the tracing of an inwardly facing surface or the tracing of an outwardly facing surface. Assuming that the start button pushed is one commanding the tracing of an inwardly facing surface, the computer first conditions the spring solenoid 146 over the line 208 to set the stylus biasing spring 140 to the full line position of FIG. 9 to bias the engagement part 102 of the stylus outwardly away from the rotational axis 28. The computer then commands rotation of the body 44 by applying an appropriate digital velocity signal to the line 178. This causes the engagement part 102 of the stylus to be swept along the length of the closed surface 18 and as it does so the output of the sensor 118 in conjunction with the amplifier 198, encoder 96 and tachometer circuit 202 operates the motor 80 to adjust the position of the carrier 56 along the axis 72 as needed to maintain a reference point on the carrier, such as the point of intersection between the stylus pivot axis 108 and the second axis 72, at or very near to a given displacement from the closed surface 18, making the position of the carrier 56 along the axis 72 an accurate representation of the spacing of the point of contact of the engagement part and the closed surface from the rotational axis 28.

During the movement of the body 44 around the rotational axis 28 the encoders 70 and 96 are repeatedly simultaneously interrogated by the computer 176 to provide point data defining the shape of the closed surface. Preferably, in a tracing operation the computer starts the body 44 at a zero position, rotates it first 360°, or slightly more, in one direction about the rotational axis 28 and then rotates the body 44 in the opposite direction to bring it back to the zero position. Point data may be taken by the computer during either one or both of these movements. Of course if the surface being traced is not fully closed, so as to be less than 360° in extent about the axis 28, the range of the rotational movement of the body 44 may be set by the computer to match the extent of the surface.

From FIG. 9 it will be noted that the analog voltage position error signal provided by the sensor 118 is also supplied through an amplifier 210 and an analog-to-digital converter 212 to the computer 176 as a digital error signal on the line 214. The computer 176 may therefore respond to this position error signal by varying the speed commands to the motor 58 so as to speed up or slow down the rate of rotation of the body 44 depending on the position error signal. Also, during readings of the encoders 70 and 96 to capture the point data the position error signal appearing on the line 214 may be captured and added to the position signal provided by the encoder 96 to produce a resultant signal more accurately reflecting, than the position signal from the encoder 96 alone, the spacing of the surface 18 from the rotational axis 28 at the involved sensing point.

FIG. 10 repeats a portion of FIG. 9 and is intended to show the apparatus 14 used with a member 24 providing an outwardly facing closed surface 22 to be traced. The omitted parts are the same as those of FIG. 9. However, in this case when a button of the keypad 36 is pushed to start the tracing operation the button pushed is one selecting the tracing of an outwardly facing closed surface, with the result that the computer 176 sets the solenoid 146 to move the stylus biasing spring 140 to the full line position of FIG. 10 so that the surface engaging part 104 of the stylus is urged inwardly toward the rotational axis 28 and into engagement with the surface 22.

The apparatus 14 as described above has the result that during the tracing operation the member engaging the enclosed surface is moved in a smooth, precise and quick manner avoiding hesitations, jerks and other uneven movements likely to occur during the use of a hand-guided tracer and likely to lead to various errors and delays. Further, the spring 140 used to bias the stylus can be, and preferably is, one applying only a very low force to the stylus sufficient to keep it in light contact with the traced surface. Therefore only very small forces are applied by the stylus to the frame avoiding undue bending of the frame even if it is a relatively weak or flimsy one supported by the holder at only a few holding points.

Figure 11:
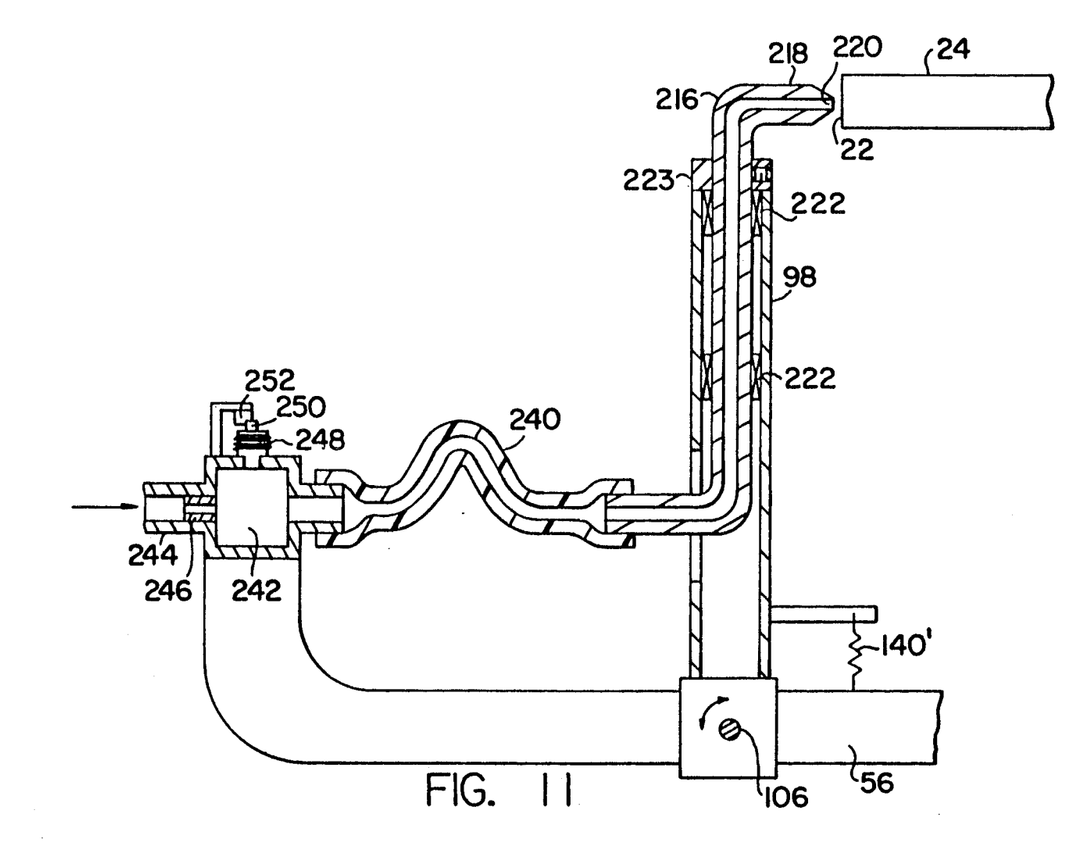
FIG. 11 is a schematic view showing an alternative embodiment of the invention wherein the sensor is a non-contacting pneumatic one.

The force applied to the frame by the sensor may be still further reduced if the sensor is made as a non-contacting one. By way of example, FIG. 11 shows such non-contacting sensor which is pneumatically operated. Referring to this figure, the stylus 98 carries at it upper end, and in place for example of the engagement part 102 of FIG. 3, a tube 216 having a nozzle portion 218 with an outlet port 220 directed toward the closed surface 22 to be traced. The tube 216 is vertically slidable in the lower portion of the stylus 98 by two sliding bearings 222 and is held at an adjustable height on the stylus by a collar 223. The lower end of the tube 216 is connected by a flexible hose 240 to a pressure chamber 242 supplied with air at a regulated pressure through a supply line 244 containing a restriction 246. The air passageway provided by the restriction 246 is substantially smaller than the air passageway provided by the hose 240 and pipe 216 and leading from the pressure chamber 242 to the outlet port 220. Therefore, it will be understood that the pressure in the chamber 242 is directly related to the displacement of the outlet port 220 from the closed surface 18 and may be used to produce a position error signal. In the illustrated case of FIG. 11 this is done by means of a bellows 248 connected with the vacuum chamber 242, which expands and contracts in keeping with changes in the air pressure in the chamber, and which carries a flag 250 cooperating with a photo sensor 252 similar to the photo sensor 118 of FIG. 7.

We claim:

1. A device for providing data describing the shape of an at least substantially closed surface, said device comprising:

a first structure, a holder for releasably holding a member providing a closed surface such as aforesaid, means supporting said holder for movement of said holder and said first structure relative to one another about a rotational axis fixed relative to said first structure and passing through and oriented generally perpendicularly to the area enclosed by said closed surface of said member held by said holding means, drive means for rotating said holder and said first structure relative to one another about said rotational axis, a carrier, means supporting said carrier for movement relative to said first structure along a second axis fixed relative to said first structure and extending generally perpendicularly to said rotational axis so that said second axis and carrier move angularly relatively to said closed surface in unison with the movement of said first structure and holder relative to one another about said rotational axis, means for moving said carrier in both directions along said second axis, a sensor carried by said carrier and operable to produce a signal which varies substantially linearly with the displacement of a reference point on said carrier from said closed surface in a direction parallel to said second axis throughout a sensing zone located in the proximity of said closed surface, means responsive to the signal produced by said sensor for operating said carrier moving means to so position said carrier along said second axis as to maintain the displacement of said reference point from said closed surface as measured parallel to said second axis at a substantially constant value as said holder and first structure are rotated relative to one another about said rotational axis, and means operable as said holder and first structure are rotated relative to one another about said first axis for at successive instants of time sensing and outputting data signals defining for each instant the angular position of said holder relative to said first structure about said rotational axis and the position of said carrier along said second axis.

2. A device as defined in claim 1, further characterized by:

said sensor being one having an engagement part which contacts said closed surface and which when arrested by said closed surface can move relative to said carrier as said carrier is moved along said second axis, and means for producing an output signal related to the displacement of said engagement part relative to the remainder of said carrier from a given neutral position.

3. A device as defined in claim 1, further characterized by:

a stylus carried by said carrier and pivotally connected to said carrier for movement relative thereto about a pivot axis located in a plane perpendicular to said second axis with said stylus extending radially from said pivot axis in a direction generally parallel to said rotational axis to an engagement part adapted to engage said closed surface, means for biasing said stylus about said pivot axis and relative to said carrier in such direction as to urge said engagement part of said stylus toward said closed surface, and said sensor including a means for sensing the position of said stylus relative to said carrier in its movement about said pivot axis.

4. A device as defined in claim 1, further characterized by:

said sensor being one which senses the displacement of said carrier reference point from said closed surface without contacting said closed surface.

5. A device as defined in claim 4, further characterized by:

said sensor being a pneumatic one including a nozzle carried by said carrier and having an opening directing a jet of air against said closed surface, said nozzle including a pressure chamber adjacent to and upstream of said nozzle opening, means for supplying air at a regulated pressure to said pressure chamber through a restriction, and means for producing an output signal related to the pressure of the air in said pressure chamber.

6. A device as defined in claim 1, further characterized by:

a stationary base structure, said holder being fixed to said stationary base structure, and said means for supporting said holder and said first structure for movement of said holder and said first structure relative to one another about a rotational axis being a means for supporting said first structure from said stationary base structure and for rotation of said first structure relative to said stationary base structure about said rotational axis.

7. A device as defined in claim 1, further characterized by:

said holder being one for releasably holding an eyeglass frame as said member so that a lens opening of said frame provides said closed surface which closed surface faces inwardly toward said rotational axis.

8. A device as defined in claim 1, further characterized by:

said holder being one for releasably holding as said member a part such as an eyeglass edging pattern, a dummy eyeglass lens, or an actual eyeglass lens, and which part provides a closed surface facing outwardly away from said rotational axis.

9. A device as defined in claim 3, further characterized by:

said holder being one adaptable to hold as said member either a first member providing a closed surface facing inwardly toward said rotational axis or a second member providing a closed surface facing outwardly away from said rotational axis, said stylus in its movement relative to said carrier about said pivot axis being moveable between two end limits and having a neutral position located between said end limits, and said means for biasing said stylus about said pivot axis being selectively adjustable so as to either urge said stylus in a first direction about said pivot axis corresponding to an urging of said engagement part away from said rotational axis for use with said first member or for urging said stylus in a second direction about said pivot axis corresponding to an urging of said engagement part toward said rotational axis for use with said second member.

10. A device for providing data describing the shape of a closed surface used as a reference for the edging of an eyeglass lens to cause it to fit into a given lens opening in an eyeglass frame, said device comprising:

a stationary base structure, a rotatable structure supported by said base structure for rotation relative to said base structure about a rotational axis fixed relative to said base structure, drive means for rotating said rotatable structure about said rotational axis relative to said base structure, a holder for releasably holding a member providing a closed surface such as aforesaid fixed relative to said base structure, said holder being so positioned on said base structure that the closed surface of a member held by said holder surrounds said rotational axis and so that the area enclosed by said closed surface is generally perpendicular to said rotational axis, a carrier supported on said rotatable structure for movement relative to said rotatable structure along a second axis fixed relative to said rotatable structure and extending perpendicularly of said rotational axis, a stylus carried by said carrier and having an engagement part for engaging the closed surface of a member held by said holder, means supporting said stylus on said carrier for movement of said stylus relative to said carrier in such a manner that said engagement part of said stylus is moveable along a line generally parallel to said second axis between first and second end positions relative to said carrier, means for biasing said stylus relative to said carrier so that said engagement part of said stylus is resiliently urged toward one of said end positions, said engagement part of said stylus as a result of rotation of said rotatable structure about said rotational axis being swept along the length of said closed surface, a position error sensor for detecting the deviation in either direction of said engagement part of said stylus from a given neutral position located between said end positions in its movement relative to said carrier and for producing a signal relative to said deviation, means responsive to said position error sensor signal as said rotatable structure is rotated about said rotational axis for moving said carrier along said second axis relative to said rotatable structure to cause said stylus engagement part to be maintained substantially at said neutral position relative to said carrier, and means operable as said rotatable structure is rotated about said rotational axis for at successive instants of time sensing and outputting data signals defining for each instant the angular position of said rotatable structure relative to said base structure about said rotational axis and the position of said carrier relative to said rotatable structure along said second axis.

11. A device as defined in claim 10, further characterized by:

said holder being adaptable to releasably hold as said member either an eyeglass frame wherein a lens opening of said frame provides a closed surface facing inwardly toward said rotational axis or a lens edging pattern or the like wherein said closed surface faces outwardly away from said rotational axis, and said means for biasing said stylus being selectively operable to bias said stylus either in the direction urging said engagement part toward said first end position or toward said second end position.

12. A device as defined in claim 10, further characterized by:

said means for moving said carrier along said second axis including a drive motor fixed to said rotatable structure, a cam driven by said drive motor, and a follower on said carrier engagable with said cam for moving said carrier along said second axis in response to movement of said cam, said cam being such that each unit of angular displacement of the output shaft of said motor results in a unit displacement of said carrier along said second axis.

13. A device as defined in claim 10, further characterized by:

said means for sensing and outputting data signals including an encoder having an output signal representing the position of said carrier relative to said rotatable structure along said second axis, and means for adding to the output signal of said encoder the signal from said position error sensor.

14. A device as defined in claim 10, further characterized by:

means responsive to said signal from said position error sensor for varying the speed at which said drive means rotates said rotatable structure about said rotational axis relative to said base structure.

* * * * *

UNITED STATES PATENT AND TRADEMARK OFFICE
CERTIFICATE OF CORRECTION

PATENT NO. : 5,121,550

DATED : June 16, 1992

INVENTOR(S) : Kenneth O. Wood, Jeffrey Murray & Robert J. Pavone

It is certified that error appears in the above-identified patent and that said Letters Patent is hereby corrected as shown below:

Column 3, line 6, after "removed" insert --.--.

Column 7, line 4, after "152" insert --.--.

Signed and Sealed this

Nineteenth Day of October, 1993

Attest:

BRUCE LEHMAN

Attesting Officer

Commissioner of Patents and Trademarks